United States Patent [19]
Rosa

[11] 3,738,104
[45] June 12, 1973

[54] GAS TURBINE FUEL FLOW METERING CONTROL SYSTEM

[75] Inventor: Hugh E. Rosa, Schenectady, N.Y.

[73] Assignee: General Electric Company, Schenectady, N.Y.

[22] Filed: July 16, 1971

[21] Appl. No.: 163,353

[52] U.S. Cl............ 60/39.28 R, 137/115, 137/608, 251/59
[51] Int. Cl............................ F02c 9/08, F02c 9/10
[58] Field of Search............... 60/39.28 R, 39.28 T; 137/115, 608; 251/59

[56] References Cited
UNITED STATES PATENTS

| | | | |
|---|---|---|---|
| 2,936,028 | 5/1960 | Gatzemeyer | 60/39.28 R |
| 3,316,712 | 5/1967 | Tyler | 60/39.28 R |
| 2,842,108 | 7/1958 | Sanders | 123/102 |
| 3,212,261 | 10/1965 | Rose | 60/39.28 R |
| 3,274,768 | 9/1966 | Klein | 60/39.28 R |

Primary Examiner—Clarence R. Gordon
Attorney—William C. Crutcher, James W. Mitchell, Frank L. Newhauser et al.

[57] ABSTRACT

A "free-wheeling" flow divider actuated by pressure of the liquid fuel meters fuel to the separate combustion chambers of a gas turbine. The actual fuel flow rate is sensed by measuring the speed of a shaft turning several positive-displacement flow dividing elements and is compared to a desired total fuel flow command signal. The difference or error signal operates a servo mechanism to adjust fuel flow rate to the "free-wheeling" flow divider.

8 Claims, 3 Drawing Figures

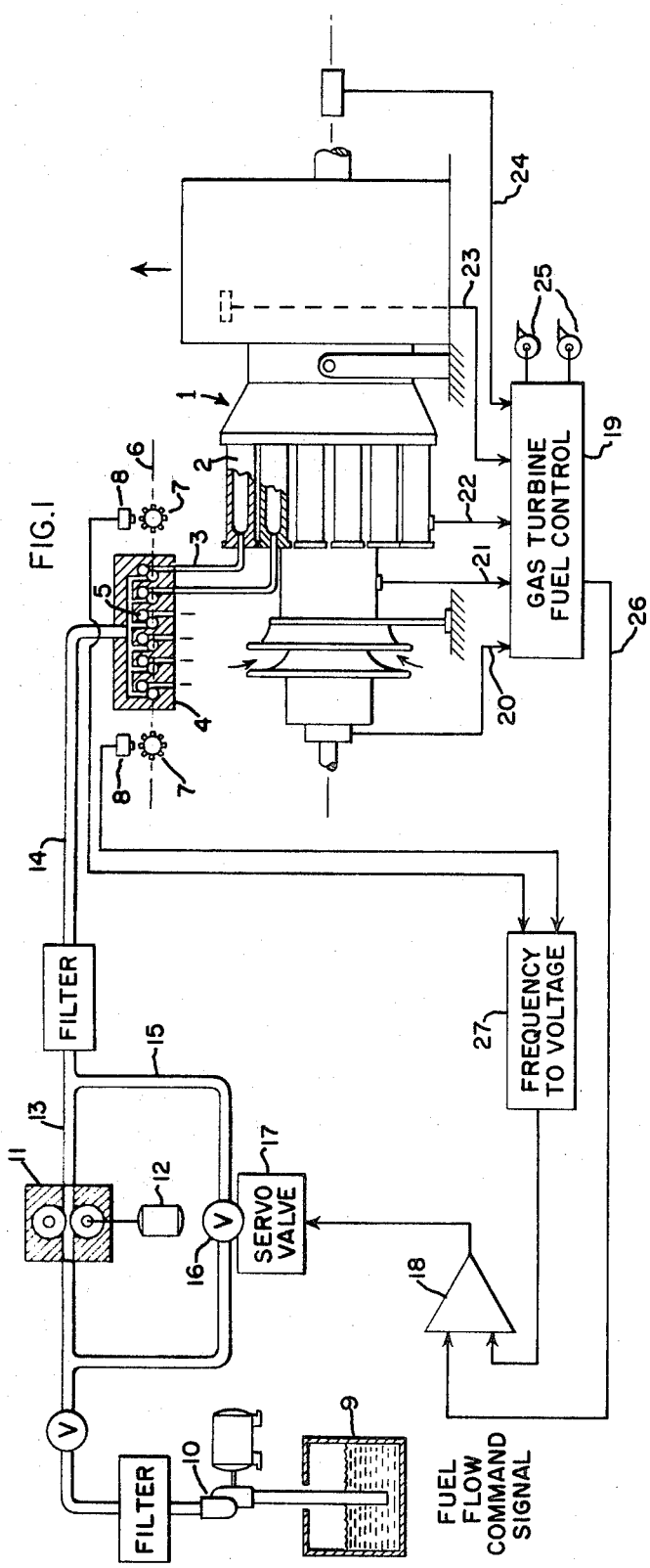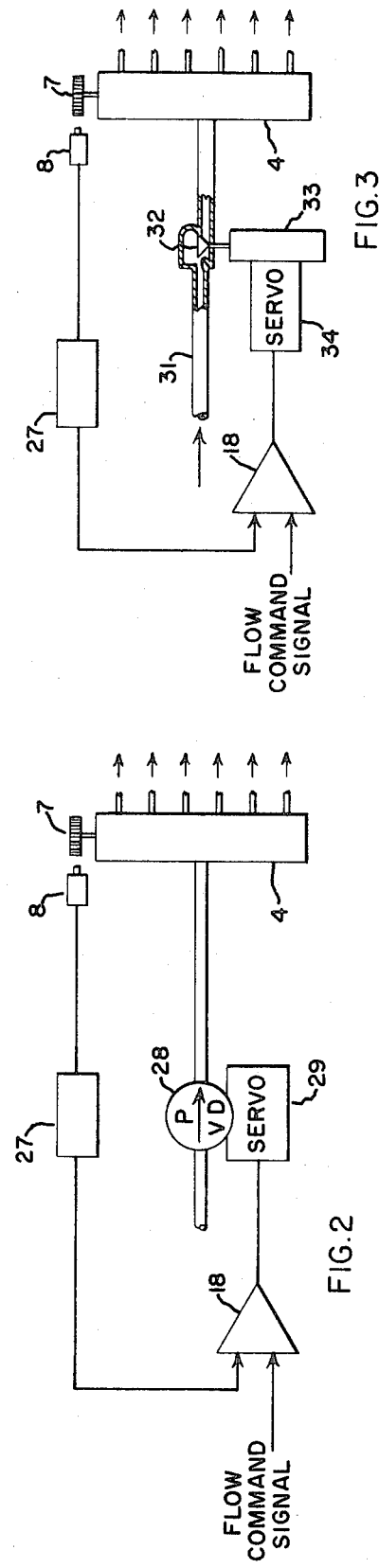

GAS TURBINE FUEL FLOW METERING CONTROL SYSTEM

BACKGROUND OF THE INVENTION

This invention relates generally to fuel systems for gas turbines having combustion chambers supplied separately with liquid fuel. More particularly, it relates to metering of fuel to one or more combustion chambers at a desired rate of flow in accordance with a desired overall fuel flow command signal.

A modern gas turbine power plant has several combustion chambers into which fuel is injected through nozzles and burned. In order to obtain uniform temperature distribution around the gas turbine circumference, equal flow rates of fuel should flow to the individual combustion chambers. Many operating difficulties will ensue if there are local areas of excessively high temperature. Many types of metering devices have been suggested in the prior art for dividing a total flow of fuel into equal portions and delivering it at a desired rate of flow into the combustion chambers.

A device which has been commonly used to deliver fuel at a controlled rate as well as divide it into equal portions is a synchronized set of positive displacement gear pumps, such as disclosed in U.S. Pat. No. 2,936,028 issued to J. B. Gatzmeyer, et al. on May 10, 1960 and assigned to the present assignee. In the Gatzmeyer et al. patent, a hydraulic driving motor is used to rotate the set of gear pumps at a speed determined by a variable displacement hydraulic pump driving the hydraulic motor. As the speed of the hydraulic motor is adjusted in accordance with a fuel flow demand signal, a fuel flow bypass valve is simultaneously actuated to return fuel to the inlet of the main fuel pump. Although the foregoing system has been very successful in delivering fuel to the combustion chambers at metered flow rates, calibration is required between positioning of the bypass valve and speed setting of the hydraulic motor. This calibration is affected by the mechanical condition of the pump components.

Other systems have been proposed for gas turbine flow dividers. U.S. Pat. No. 2,599,680 to Weeks shows a flow divider which is driven at a varying speed in response to a pressure differential across one of the flow metering elements. The inlet flow rate to the group of metering devices is controlled by a bypass valve similar to the Gatzmeyer patent, but there is no direct correlation between the speed at which the metering devices are driven and the rate at which fuel is supplied to the metering devices.

British Pat. No. 819,760 and U.S. Pat. No. 2,566,373 to E. M. Redding show gas turbines using "free-wheeling" flow dividers which do not require a driving device as in the foregoing Gatzmeyer and Weeks patents, but are rather driven by the pressure of the fuel supplied to the metering elements. Calibration between the total fuel flow control device and the rate of fuel actually supplied by the metering elements is dependent upon the mechanical condition of the pump as in the foregoing patents.

Systems have also been proposed which purport to control fuel flow in response to flow rate or fuel pressure, such as U.S. Pat. No. 2,851,855 to Gamble, No. 3,128,603 to Haigh and No. 3,413,806 to Belke et al. However these systems do not serve to divide the fuel flow while controlling the flow rate.

Accordingly, one object of the present invention is to provide an improved flow dividing control system for a gas turbine for precisely metering fuel flow from the individual elements in response to a desired fuel flow command signal supplied to the system.

Another object of the invention is to provide an improved control system for a "free-wheeling" flow divider actuated by pressure of the fuel, but supplying fuel at a controlled rate of flow to the combustion chambers.

Another object of the invention is to provide an improved flow dividing control system which may be used with several different types of fuel supply devices.

DRAWINGS

The invention, both as to organization and method of practice, together with further objects and advantages thereof, will best be understood by reference to the following specifications, taken in connection with the accompanying drawings, in which:

FIG. 1 is a simplified schematic drawing of a gas turbine with a fuel flow dividing control system using a positive displacement fuel pump, and FIG. 2 is a modified form of the invention using a variable displacement fuel pump, and FIG. 3 is another modification using a throttling valve to control flow from a pressurized fuel main.

SUMMARY OF THE INVENTION

Briefly stated, the invention is practiced by providing means to control fuel inlet flow rate to a flow divider comprising a synchronized set of positive displacement metering elements. Speed of the set (and hence flow rate) is measured and compared to a fuel flow command signal. The resulting error signal operates a servo mechanism which adjusts actual flow rate to cause it to correspond to desired flow rate.

DESCRIPTION OF THE PREFERRED EMBODIMENT

Referring now to FIG. 1 of the drawing, a gas turbine 1 has a number of individual combustion chambers 2 disposed about its periphery. The fuel nozzle in each combustion chamber is fed from a separate fuel line 3, supplied in parallel flow relationship from a metering flow divider 4.

Flow divider 4 is constructed so as to operate a number of positive displacement metering devices such as individual gear pumps 5. The gear pumps 5 all are synchronized to turn at the same speed. For this purpose they may be mounted on a common shaft 6 as indicated or alternatively may be arranged in a circular configuration and geared to a common synchronizing pinion.

The metering elements are constructed so as to be rotated by the liquid pressure difference between the inlet and outlet of the flow divider. One such suitable flow divider is manufactured by Roper Pump Company, Commerce, Ga., Model No. 2901.

The speed of shaft 6 and hence the speed of each of the gear pumps 5 is indicated by a two-toothed wheels 7 and two magnetic reluctance sensors 8 producing pulses as the wheels 7 turn. One wheel 7 and one sensor 8 would be sufficient to measure the speed, but two are employed to provide an added measure of safety. Alternatively, a tachometer generator may be substituted for toothed wheel 7, sensor 8, and converter 27 to give a voltage proportional to speed.

Since liquid fuel is essentially incompressible and since the gear pumps 5 are positive displacement devices, i.e., have practically no leakage, the speed of shaft 6 is proportional to the rate of fuel flow supplied through each of the individual fuel lines 3 to the gas turbine combustion chambers.

The fuel supply system for the flow divider 4 comprises a fuel supply tank 9, motor driven pump 10 and a positive displacement pump 11. Pump 11 is driven at a constant rate of speed by a motor 12 (or alternatively from the gas turbine shaft) so as to supply a constant rate of fuel flow through pipe 13. A line 14 carries a portion of the total flow to the inlet of flow divider 4, while the remaining portion of fuel flows through bypass line 15, as controlled by valve 16, back to the inlet of the displacement pump 11. Thus the position of bypass valve 16 serves to vary the rate of fuel flow furnished to flow divider 4.

A servo valve 17 which may be of the type manufactured by Moog Control Division, East Aurora, N. Y., Model No. 77-131, positions bypass valve 16 in response to the output of an operational amplifier 18. The general characteristic of such a valve 16 is that it provides an output flow proportional to input current. Operational amplifier 18 is a commercially known device which can be connected as a summer so that the output voltage is the sum of the magnitude and polarity of the applied input voltages. Other types of known summing devices or comparators, with or without amplification of the output signal may be substituted.

The fuel flow command signal used to set the desired fuel flow rate to the gas turbine is produced by a gas turbine fuel control system indicated generally at 19. This may be one of several types and is responsive to various operating parameters of the gas turbine such as a compressor speed signal 20, compressor pressure signal 21, flame detector signal 22, exhaust temperature signal 23, and load turbine speed signal 24. Various operator-controlled input signals are indicated at 25. The fuel control 19 may be of the type shown in U.S. Pat. No. 3,520,133 issued to A. Loft et al., on July 14, 1970, known by the assignee's trade-mark SPEEDTRONIC, and assigned to the present assignee, this patent being incorporated herein by reference. The output signal at 26 is a voltage representative of a desired fuel flow to the gas turbine. It is applied as one input to operational amplifier 18.

The other input to operational amplifier 18 is a signal representing actual rate of fuel flow obtained from the speed of the gear synchronizing shaft in the freewheeling flow divider 4. Pulses from sensors 8 are converted in a converter 27 to a voltage proportional to actual fuel flow, since the frequency of pulses is proportional to fuel flow as explained previously.

OPERATION

A fuel flow command signal is applied as a voltage to output line 26 from the gas turbine fuel control 19 in response to operating conditions of the gas turbine. This voltage is applied at the input to operational amplifier 18 with a voltage obtained from rotational speed of the flow divider elements 5. The error signal actuates servo valve 17 to reposition bypass valve 16 so as to adjust the total flow rate to flow divider 4 so as to reduce the error to 0. System is independent of the condition of the components of the main flow pump 11 or the calibration of the bypass valve 16. Thus actual metered flow rate exactly matches the desired flow rate. Furthermore, since the metering elements are synchronized to turn at the same rate, the proportionally smaller rates of flow to each combustion chamber are equal to one another and therefore provide uniform temperature distribution around the gas turbine.

MODIFICATION 1

FIG. 2 shows a modified form of the invention while omitting some of the details shown in FIG. 1 which are not necessary to an understanding of the invention. Identical reference numerals are used where they correspond to FIG. 1. Rather than employing a positive displacement fuel pump and a bypass line as in FIG. 1, a variable displacement pump 28 is used. This may be one of many known types such as Model No. 226A1249 manufactured by New York Air Brake Co. having a variable stroke. The pump stroke is set by a servo device 29, which is often an integral part of the pump in commercial devices of this type.

The operation of the FIG. 2 modification is the same as in FIG. 1. The output from operational amplifier 18 representing a different or error signal between actual and desired fuel flow rate signals operates servo 29 and readjusts the delivery from pump 28 so as to make actual flow correspond to desired flow. As before, the pressure at the outlet from pump 28 provides the impelling force to drive the synchronized set of metering devices in the flow divider 4.

MODIFICATION 2

FIG. 3 shows another modification, wherein fuel delivered to the gas turbine is supplied from a high pressure fuel main 31. An example would be a branch line from the outlet of a liquid fuel pipe line pumping station serviced by the gas turbine.

Fuel under pressure suitable for driving the free-wheeling flow divider 4 is supplied through the line 31 and the flow rate is varied by means of a throttling valve 32 actuated by a hydraulic piston 33. Piston 33 is positioned by a hydraulic servo valve 34.

Operation of the FIG. 3 modification is much the same as previously described. Speed of the synchronizing shaft of the free-wheeling flow divider 4 is converted to a fuel flow rate voltage signal at 27 and compared in operational amplifier 18 with a flow command signal. The error signal corrects the position of the hydraulic piston 33 so as to increase or reduce flow rate to the flow divider and reduce the error to zero.

Thus, there has been described an improved flow dividing fuel system for a gas turbine which is less complex than previous systems and furthermore does not depend on precise positioning of a series of mechanical components to control output. Its operation is independent of the wear of various components such as the pumps supplying the liquid fuel and the calibration of the other various components.

While there has been shown what is considered to be the preferred embodiment of the invention and two modifications thereof, it is of course understood that various other modifications may be made therein, and it is intended to cover in the appended claims all such modifications as fall within the true spirit and scope of the invention.

What is claimed is:

1. In a gas turbine fuel flow dividing control system of the type having a plurality of individual fuel lines to be furnished with equal metered flow rates of fuel for the combustion chambers of a gas turbine in response to a fuel flow command signal, the improvement comprising:

a source of liquid fuel under pressure, a free-wheeling flow divider including a plurality of positive displacement metering elements supplied from an inlet and connected at a plurality of outlets to said individual fuel lines, said elements being constructed to rotate when subjected to a pressure difference, rotatable synchronizing means causing said elements to turn in unison, flow rate control means supplying an adjustable flow rate of liquid fuel from said source to said inlet of the flow divider at a pressure sufficient to actuate said metering elements, means responsive to the speed of said synchronizing means for producing a signal proportional to actual flow rate, and summing means arranged to compare said flow rate signal to said fuel flow command signal and having an output connected to actuate said flow rate control means.

2. The combination according to claim 1, wherein said flow rate control means comprises a positive displacement pump with a bypass valve connected at the pump outlet and arranged to return flow to the pump inlet.

3. The combination according to claim 1, wherein said flow rate control means comprises a variable displacement pump with means to control the pump displacement stroke.

4. The combination according to claim 1, wherein said flow rate control means comprises a flow throttling valve connected between said pressurized fuel source and said flow divider.

5. The combination according to claim 1, wherein said metering elements are gear pumps and wherein said synchronizing means is a common shaft carrying said gear pumps.

6. The combination according to claim 1, wherein said metering elements are gear pumps and wherein said synchronizing means is a common pinion geared to said gear pumps.

7. The combination according to claim 1, wherein said speed responsive means comprises a toothed wheel connected to be rotated by said synchronizing means, a variable magnetic reluctance sensor for providing pulses in response to rotation, and a converter for producing a voltage proportional to pulse frequency.

8. The combination according to claim 1, wherein said speed responsive means comprises a tachometer generator connected to be rotated by said synchronizing means.

* * * * *